Jan. 22, 1935.   J. DE LA CIERVA   1,988,836
AIRCRAFT HAVING ROTATIVE SUSTAINING MEANS
Filed Feb. 12, 1932   2 Sheets-Sheet 1
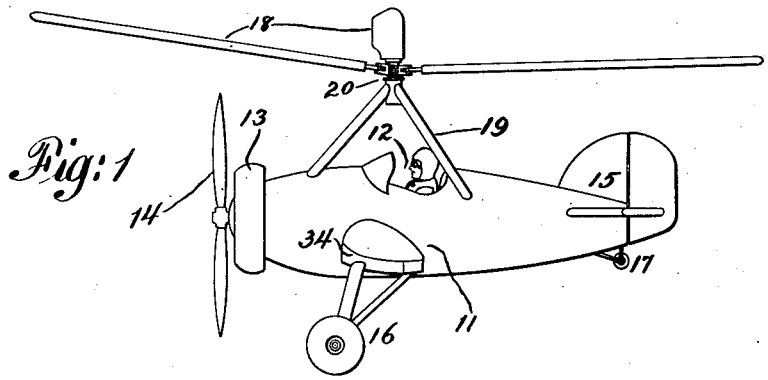
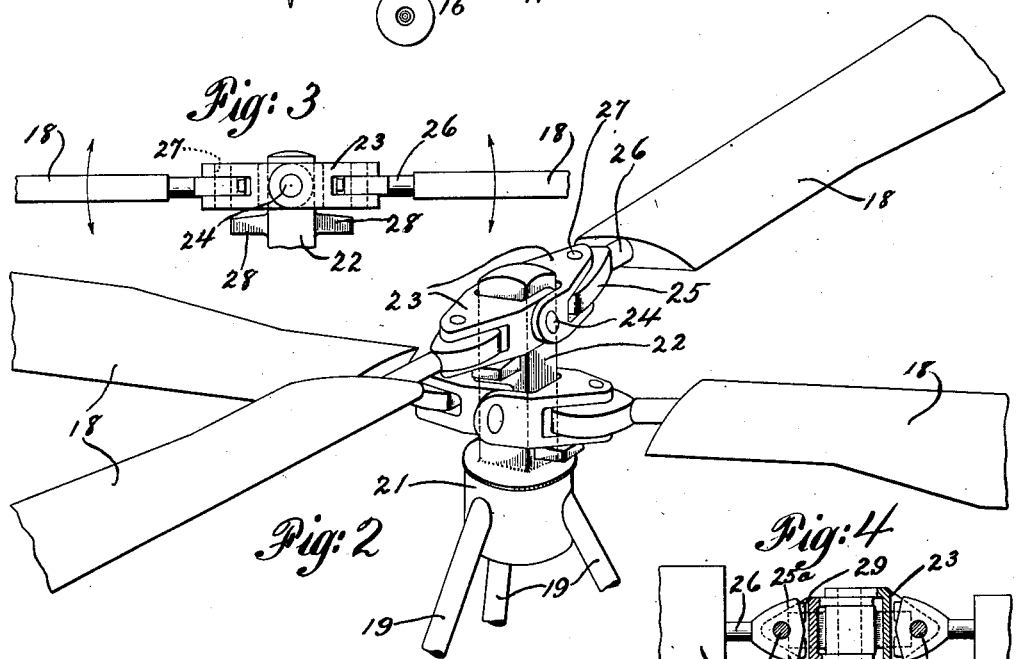
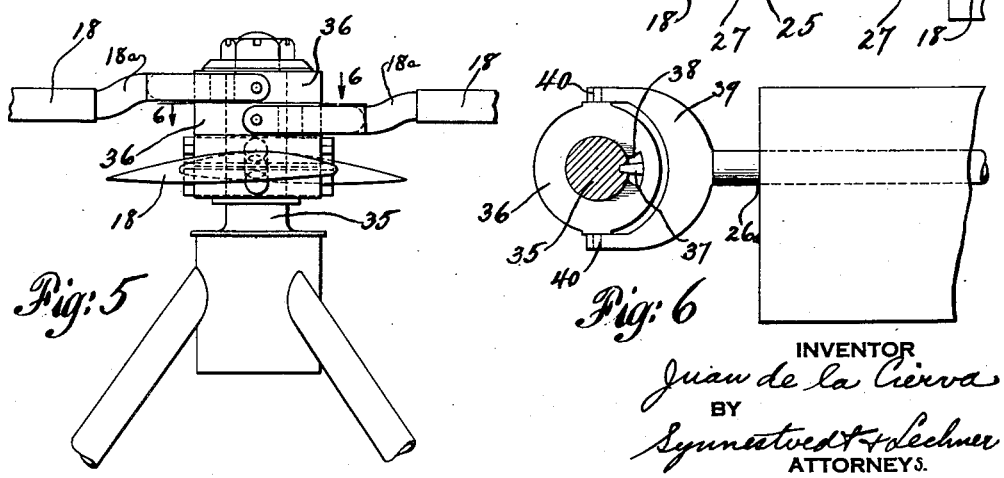
INVENTOR
Juan de la Cierva
BY
Synnestvedt & Lechner
ATTORNEYS.

Jan. 22, 1935.  J. DE LA CIERVA  1,988,836
AIRCRAFT HAVING ROTATIVE SUSTAINING MEANS
Filed Feb. 12, 1932   2 Sheets-Sheet 2
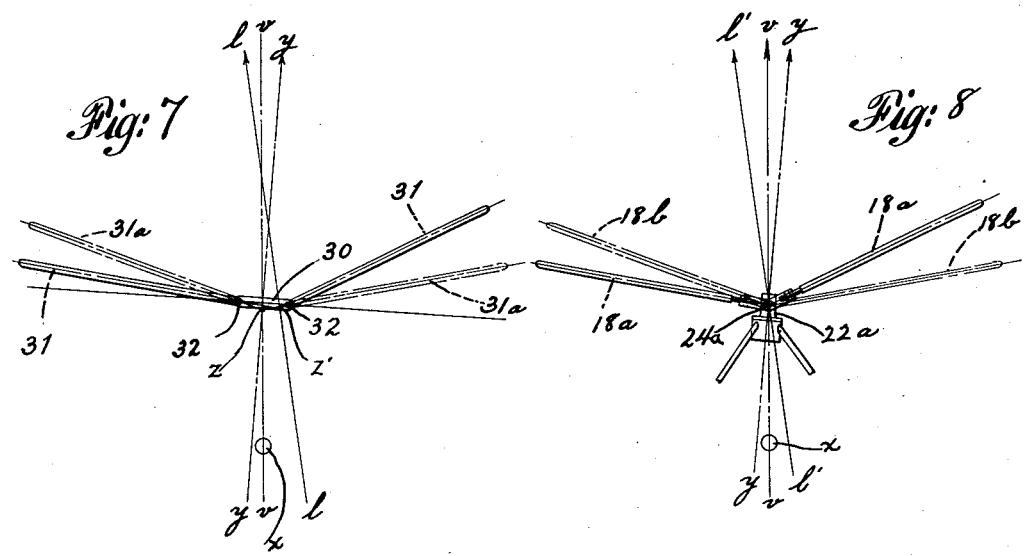
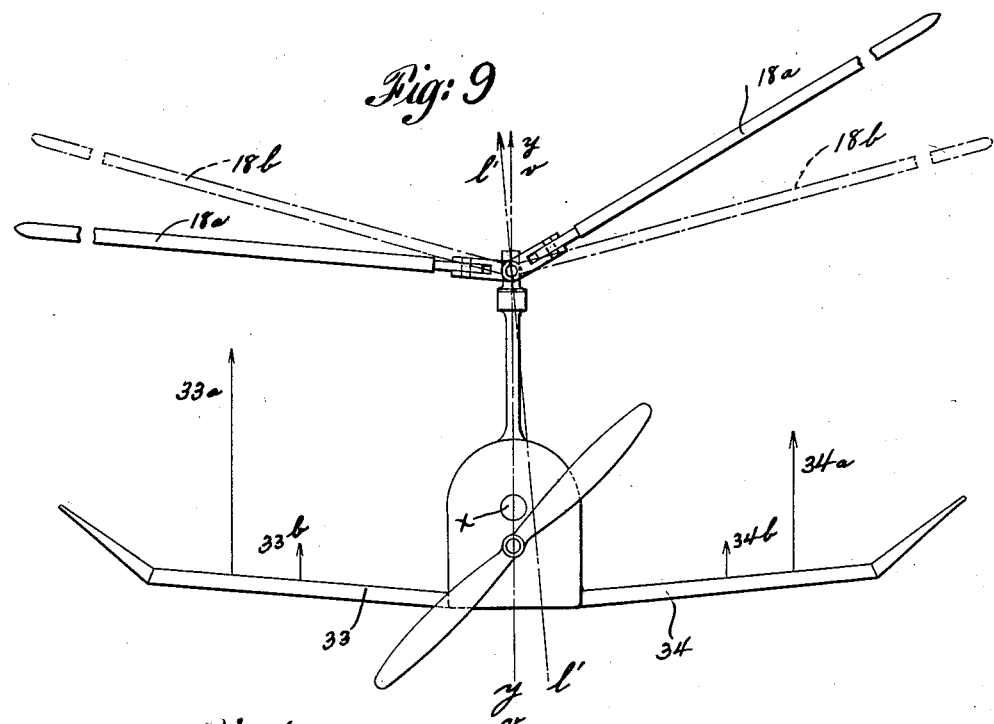
INVENTOR
Juan de la Cierva
BY
Synnestvedt & Lechner
ATTORNEYS.

UNITED STATES PATENT OFFICE 1,988,836

AIRCRAFT HAVING ROTATIVE SUSTAINING MEANS

Juan de la Cierva, Madrid, Spain, assignor to Autogiro Company of America, Philadelphia, Pa., a corporation of Delaware Application February 12, 1932, Serial No. 592,487

14 Claims. (Cl. 244—19)

This invention relates to aircraft having rotative sustaining means, and is especially concerned with the type of craft in which the sustaining means takes the form of a rotor composed of a plurality of sustaining blades or wings individually articulated or pivoted to a common substantially upright axis structure and normally actuable by relative air flow.

The invention, furthermore, is more specifically concerned with a novel arrangement and construction of the sustaining rotor which constitutes the primary means of sustension for the craft, and also of certain supplemental lifting surfaces with which the craft may be equipped.

As one of the primary objects, the invention has in view improvement in the balance of the rotor and also improvement in the balance and stability of the craft as a whole. Improved controllability under various flight conditions is also sought.

Another object of the invention is involved in the arrangement and mounting of the several wings or blades of the rotor in such manner as to reduce bending moments to which the rotor hub and mounting structure are subjected in operation.

Still further, in accordance with this invention, roughness and vibrations in the rotor system are materially reduced, so that dangers incident to fatigue in these parts are also reduced.

Other objects and advantages will appear more clearly if it be borne in mind that in aircraft of the general type to which this invention relates, the lift line of the rotor is differently positioned or extended under different conditions of flight. That is, the lift line of the rotor shifts both fore and aft as well as laterally of the craft in different attitudes and conditions of flight, with the result that, even though the approximate center of the rotor system be disposed generally vertically above the center of gravity of the craft, the location of the lift line of the rotor is variable with respect to the location of the center of gravity of the craft.

It is an object of this invention to arrange the blade mounting structure, particularly the articulations for the individual blades, in a manner to reduce the excursion or variation of the lift line with respect to the center of gravity of the craft as a whole.

A further object of the invention resides in the construction and arrangement of substantially fixed lifting surfaces, as a supplemental means of sustension for the craft, in a manner to at least partially compensate for differences in the angularity or position of the lift line of the rotor, particularly laterally of the craft.

The invention also has in view mounting of the rotor system with the blades attached thereto in positions to travel in different paths spaced vertically from each other. In providing such an arrangement, the blades of the upper and lower groups are staggered with respect to each other, so as to increase clearances between blade mounting and articulation parts. This is particularly useful in permitting the mounting of blade articulations relatively close to or on the center of the axis of the rotor.

I further contemplate, in certain forms of the invention, a dual or double articulation of the rotor blades or wings to accomplish a combination of results having an advantage peculiar to the present type of aircraft, to wit: the wings are articulated to their common rotative axis by horizontal pivot means intersecting said axis, and in addition each wing is individually pivoted on a vertical hinge or axis offset from the common rotational axis; suitable limiting stops being provided for the various wing movements. By this construction, bending and vibration arising from swinging of the wings transversely of their plane of rotation (which is the direction of their greatest magnitude of swinging movement in flight) are substantially eliminated and the wings are allowed maximum freedom for movement in such direction; whereas the maintenance of a certain offset of the individual vertical pin of each wing from the center of rotation results in a predetermined restoring force tending to control the individual wing movements fore and aft in their general path of rotation. A controlled wing swinging in the plane of rotation is thus obtained, while at the same time a minimum of resistance is offered to their swinging transversely of the plane of rotation. This arrangement is of peculiar advantage in obtaining smoothness of rotor operation, and in eliminating the necessity for yielding interconnections or cables between the wings of the rotor.

In addition to all the foregoing, the invention has in view general simplification of the mounting structure for the rotor, and reduction in the overall dimensions and weight of the parts necessarily employed.

How the foregoing objects and advantages, together with others which will occur to those skilled in the art, are obtained will be more apparent from a consideration of the following description making reference to the accompanying drawings, in which Figure 1 is a somewhat diagrammatic side elevational view of a craft constructed to embody various features of the present invention;

Figure 2 is an enlarged perspective view of a portion of the rotor mounting structure, including the root ends of the several blades incorporated in the rotor itself;

Figure 3 is a side elevational view of certain parts shown in Figure 2;

Figure 4 is a top view of parts illustrated in Figures 2 and 3, certain portions of the structure in this view, however, being broken away and shown in horizontal section for the purpose of clarity;

Figure 5 is a side elevational view of a modified rotor head or hub structure including a showing of a portion of several rotor blades;

Figure 6 is a horizontal sectional view taken substantially as indicated by the section line 6—6 on Figure 5;

Figures 7 and 8 are diagrammatic views of portions of two different rotor systems, the views being arranged to illustrate the varying position of the rotor lift line under different conditions of flight;

Figure 9 is a diagrammatic view illustrating various flight conditions encountered with a craft having a rotor system as well as supplementary fixed wings; and Figure 10 illustrates the differential incidence setting which I may employ for the supplementary fixed wings of a craft of the type shown in Figure 9.

Referring first to Figure 1, the craft here shown includes a fuselage 11 having a cockpit 12 therein for the pilot. At the forward end, an engine 13 and propeller 14 are provided, while an empennage structure 15 is disposed rearwardly of the fuselage 11. The craft shown is also equipped with an undercarriage 16 and a tail wheel 17.

The primary means of sustension for the craft, as above noted, takes the form of a system of rotative sustaining wings or blades, these being illustrated in Figure 1 by the numeral 18. The system is mounted above the body of the craft as by means of post or leg elements 19 which serve to support the rotor head generally indicated at 20.

As better seen in Figures 2, 3 and 4, the post elements 19 converge in an apex structure 21 which serves as a bearing support for the freely rotative spindle or axis member 22. In the rotor system shown, there are four sustaining blades or wings 18 and these blades, as clearly seen in Figure 2, are arranged in pairs, the blades of each pair lying in the same general plane, with the plane of one pair spaced vertically from that of the other.

The axis member 22, furthermore, is shown as being squared and the blades of each pair are secured thereto by means of forked members 23 which embrace the part 22. In accordance with the preferred arrangement, the forked members 23 for each pair of blades are secured to the axis part 22 by a common substantially horizontally disposed pivot pin 24 providing an axis intersecting the rotational axis of the rotor, the two forks 23 of a pair of blades having an interfitting cooperation with the axis member 22 but being individually pivoted with respect to the axis 24. Each member 23 is additionally forked at its outer end to receive the part 25 which, in turn, is secured to or mounted on the inner end of the blade spar 26. A substantially vertically extended pivot pin 27 serves to articulate the parts 23 and 25 to each other.

In accordance with the foregoing structure, each blade is permitted movement independently of the others both upwardly and downwardly as well as forwardly and rearwardly in the general path of rotative travel. Thus, in flight, the blades are free to assume positions of equilibrium between inertia, lift, drag, anti-drag and other flight forces.

As additional structural features, the mounting structure shown in Figures 2, 3 and 4 includes stop members 28 projecting laterally from the axis part 22 in position to support the blades when they are inactive or rotating below flight speeds. Additionally, the invention makes provision for controlling independent blade movements about the individual vertical pivot pins 27. As clearly seen in Figure 4, this means includes abutments 25a formed at each side of the part 25 in position to cooperate with the base or crotch of the outer forked end of the block 23. Resilient or rubber bumpers or cushions 29 may be interposed between the cooperating stop means at each side of the vertical pin in order to yieldingly control at least certain blade deflections.

Before proceeding with a description of the modified blade mounting arrangement shown in Figures 5 and 6, reference should be made to Figures 7 and 8. In Figure 7, the center of gravity of a craft equipped with a sustaining rotor of a type heretofore employed is indicated at $x$, and as here shown, a rotor axis or hub part 30 is located generally vertically above the center of gravity $x$. In this instance, the blades 31 (only a pair thereof being illustrated) are pivoted to the hub member 30 at points spaced outwardly from its axis $y$—$y$, the pivoting being accomplished, for example, by means of the substantially horizontal pins 32. It will be seen, furthermore, that the rotor is mounted with its axis $y$—$y$ inclined with respect to the vertical $v$—$v$.

It should now be noted that the lift line of a rotor system having horizontally articulated blades or wings approximately bisects the angle formed between the longitudinal axes of the blades or wings at opposite sides of the system. Furthermore, since the blades at opposite sides of the system swing upwardly and downwardly to different degrees under different flight conditions, when the horizontal articulations are offset from the center of rotation (as shown in Figure 7) the lift line of the rotor shifts to different positions in accordance with the flight conditions prevailing.

Heretofore, a rotor system of the character shown in Figure 7, i. e., with offset horizontal pivots 32, has been mounted to rotate about an axis which is inclined with respect to the vertical. The showing of Figure 7 illustrates this inclination laterally of the craft, it being assumed that the view is taken from the front of the craft and that the particular rotor has its blades 31 retreating at the right hand side of the figure and advancing on the left. With a rotor of the opposite sense of rotation, however, the lateral inclination, of course, would be in the opposite direction from that shown in Figure 7.

Assume now that the craft of Figure 7 is descending substantially vertically. Under this condition, the blades shown in full lines at 31—31, will assume positions such as shown at 31a—31a. That is, the blades on opposite sides will become coned or angled upwardly with respect to the axis y—y an equal amount on each side of the rotor. In view of the fact that the longitudinal axes of the blades in these positions intersect at a point z on the rotor axis y—y, the lift line of the rotor substantially coincides with the rotor axis, it being here noted that the resultant lift line thus passes to the left of the center of gravity x.

In forward flight, on the other hand, the rotor blades individually rise and fall, to a considerable extent, in each revolution, owing to the fact that each blade has an air speed (when it is advancing in the direction of the line of flight) approximately equal to its rotational speed plus the forward speed of the machine, whereas each blade as it travels rearwardly, at the opposite side of the machine, has a speed equal substantially to its rotational speed minus the speed of advancement of the craft. Due to inertia, and for other reasons, however, the blade does not attain its highest coned position on the advancing side but attains such position shortly after it passes over to the retreating side. Although the angles in Figure 7 are exaggerated, the blade 31 in full lines at the left of the figure indicates an advancing blade, which is rising, and the blade 31 in full lines at the right of the figure indicates a retreating blade, in the act of descending. It will now be seen that the point of intersection of the longitudinal axes of the blades in forward flight has moved to the right to a point $z'$ and also that the lift line 1—1 passes the center of gravity x at the right hand side of the figure.

The purpose of inclining the axis of the rotor as a whole in the manner shown in Figure 7 was to more or less "average" the excursion of the lift line on the two sides of the center of gravity x.

The construction of the present invention, as contrasted with Figure 7, materially reduces the excursion or displacement of the lift line. In explanation, reference is made to Figure 8, illustrating the improvement resulting from the present invention, in which the rotor mounting structure 22a is illustrated as being disposed with its axis y—y similarly angled with respect to the vertical line v—v. In this figure, the blades shown in full lines at 18a—18a are joined to the axis member 22a in the manner disclosed in Figures 1 to 4 inclusive, i.e., with the horizontal articulation of the blades intersecting the axis of rotation as at 24a. Since the lift line approximately bisects the angle formed between blades at opposite sides of the rotor, the lift line will at all times pass through a point on or at least closely adjacent to the point of horizontal articulation. With such an arrangement, furthermore, in vertical descent, the blades at opposite sides of the rotor will assume equal coning angles (see dotted line showing at 18b) with the result that the line of lift will lie nearer the longitudinal vertical mid plane referred to. Additionally, even in high speed forward flight the lift line 1'—1' will pass the center of gravity only slightly to one side thereof, the blades being shown in full lines at 18a—18a to diagrammatically illustrate positions which they may assume during such high speed forward flight.

While Figures 7 and 8 are only diagrammatic, they illustrate the basic idea involved in the present invention (embodied in Figure 8) to wit: the reduction of the range of travel of the rotor lift line under varying flight conditions.

In view of the fact that the maximum shift of the lift line, relative to the center of gravity, between flight conditions varying from high forward speed to vertical descent, is thus made relatively small, I may, if desired, mount or position the rotor hub to rotate about an axis lying in the longitudinal mid plane containing the center of gravity, and still have less excursion of the lift line, in high speed forward flight, than was incident to earlier constructions, and this I have illustrated in Figure 9.

In considering the foregoing, it should be borne in mind that it is highly desirable that an aircraft of this type have maximum balance when making vertical or substantially vertical descent. A slight offsetting of the lift line with respect to the center of gravity is not of such great importance in high speed forward flight for the reason that the control surfaces with which the craft is equipped are highly efficient to control the lateral attitude of the craft at such time.

As a further feature of this invention, I contemplate employing supplemental fixed lifting surfaces 33—34 (see Figures 1 and 9) arranged at opposite sides of the craft. As diagrammatically shown in Figure 10, the wing 33 which is positioned below the advancing side of the rotor is set at a positive effective aerodynamic incidence as compared to the setting of the wing 34 at the opposite side. Thus, with a rotor arranged in accordance with Figure 9, in high speed forward flight the wing 33 produces relatively greater lift than the wing 34, for example, as suggested by the arrows 33a and 34a. Such an arrangement automatically compensates for the offsetting of the rotor lift line 1'—1' in high speed forward flight.

In approximately vertical descent, however, when the blades of the rotor cone up equally as indicated at 18b and produce a lift coinciding with the vertical and axis lines v—v and y—y through the center of gravity x, the fixed wings 33—34 afford so little lift that the difference between their incidence setting is of negligible effect, and as suggested by the arrows 33b—34b, the fixed wing lift at opposite sides is very small and substantially equal.

In addition to the foregoing consideration, it should be borne in mind that the location of the horizontal articulations in position to intersect the axis of the rotor also serves to reduce the shift or movement of the lift line with respect to the center of gravity in a fore and aft direction. Improved longitudinal balance is therefore also provided.

Turning now to the showing of Figures 5 and 6, it will be seen that each blade is mounted on the central hub or spindle part 35 by means of a collar or ring 36. This ring may rotate about the axis member 35 to an extent limited by the stop 37 which works in the arcuate cavity 38. A yoke or forked member 39, secured to the blade spar 26a, is pivoted as at 40—40 to the ring 36.

The blades, in this instance, are also arranged to extend at different sides of the axis structure and the several mounting rings therefor are superimposed on the central spindle 35. In order that the blades of each pair may extend at opposite sides of the hub structure in substantially one plane, the root ends of the blade spars or the forked fittings 39 therefor are bent or extended, one upwardly and one downwardly as indicated at 18a in Figure 5. This serves to provide smoothness of operation even though the individual blades be secured to the axis mechanism at vertically spaced points.

In accordance with this arrangement, therefore, the horizontal blade articulations again intersect the common axis of the rotor and at the same time, the individual blades are permitted freedom for limited independent movement fore and aft in their general path of travel about an axis coinciding with the rotor axis. Bending moments and the like may be still further reduced by such a construction.

By way of summary, it is observed that the maximum shift in the lift line with respect to the center of gravity, occurring between conditions of vertical descent and high speed forward flight, is materially reduced. The reduction, furthermore, is sufficient to permit positioning of the rotor axis so as to pass generally vertically through the center of gravity of the craft as a whole (as in Figure 9). One of the primary advantages of such an arrangement lies in the fact that, in vertical descent, the lift line will pass substantially through the center of gravity of the craft and maximum balance for this maneuver is therefore provided. At the same time, the excursion of the lift line (in high speed forward flight) has been reduced to such a degree that I can compensate therefor by constructing the supplementary fixed lifting surfaces to afford greater lift at one side than on the other side of the craft in high speed forward flight.

Finally, the structure of this invention makes it possible to locate the horizontal articulations relatively close to the axis of the rotor, or in position to intersect the rotor axis, without reducing clearances for blade swinging movements. Bending moments and vibrations in the mounting structure are also reduced so that smoother operation results.

I claim:—

1. In an aircraft having a mounting structure providing a generally upright axis, and having a system of rotative sustaining blade or wing means mounted for rotation about said axis and for upward and downward swinging movement about an axis intersecting said upright axis, in which construction the lift line extends in different directions under different flight conditions, supplemental fixed sustaining surfaces extended at opposite sides of the craft and set at different effective aerodynamic incidence, whereby to compensate for shift in the angle of lift of the rotor system under certain flight conditions.

2. In an aircraft, a primary means of sustension including a set of pivotally and rotatively mounted sustaining wings or blades normally actuable by relative air flow, in which construction there is a variable lateral positioning of the lift line of said system under different flight conditions, and means automatically acting under the influence of varying flight conditions to produce variable lift effects compensating for said lateral variations in said lift line.

3. In an aircraft having as its primary means of sustension a system of pivotally and rotatively mounted sustaining wings or blades normally actuable by relative air flow, in which construction the lift line shifts to different positions under different flight conditions, supplemental fixed sustaining surfaces extended at opposite sides of the craft and set at different average effective aerodynamic incidences, whereby to compensate for shift of said lift line of the rotor system under certain flight conditions.

4. In an aircraft having a body, and a system of pivotally arranged sustaining blades mounted generally above the center of gravity of the craft for normally free rotation under the influence of relative air flow about a substantially upright axis, in which construction, at least during relatively high forward speed, the line of lift of the rotor passes to the side of the center of gravity of the craft on which the blades are retreating with respect to the direction of flight, supplemental fixed sustaining surfaces substantially symmetrically arranged at opposite sides of the craft, the surface at the side of the craft on which the blades are advancing during forward flight having an average effective positive incidence as compared with the surface at the other side of the craft.

5. In an aircraft, a primary sustaining system of rotative wings including a common rotative hub structure mounted for rotation about an upwardly extending axis lying substantially in the longitudinal vertical plane containing the center of gravity of the craft, and means flexibly articulating the wings to said common hub structure so that said wings may be freely rotated and swung under the influence of flight forces, and said articulation means including a pivot axis substantially intersecting said common axis of rotation so that each wing may individually assume positions of substantial equilibrium, whereby the lift line of the rotative system substantially coincides with said plane in approximately vertical descent of the craft and deviates only slightly from said plane in high speed forward flight of the craft, and supplemental fixed surfaces automatically producing a variable lift as between the two sides of the craft in high speed forward flight to compensate for the slight divergence of the lift line of the rotating system at high speeds.

6. In an aircraft sustaining rotor, sustaining blades or wings arranged in groups for rotation in the same direction about a common generally upright axis, a mounting structure providing said axis, means for mounting the blades of one group to rotate in a path spaced thereabout closely adjacent to the path of the blades of another group, the mounting means further providing for radial extension of the blades of the several groups from said structure in staggered relation, and pivot means for the blades of each group providing for upward and downward swinging movement thereof on axes intersecting said upright axis.

7. In an aircraft, a system of rotary sustaining wings or blades adapted to be wind driven in flight, a mounting structure for the several blades providing for comon rotation thereof about a substantially upright axis, and a pivot means for each blade for securing its inner end to the mounting structure having a pivot axis intersecting the said upright axis of the mounting structure and arranged to provide for individual upward and downward swinging movements of the blades under the influence of flight forces.

8. In an aircraft, a system of rotary sustaining wings or blades adapted to be wind driven in flight, a mounting structure for the several blades providing for common rotation thereof about a substantially upright axis, a pivot means for each blade for securing its inner end to the mounting structure having a pivot axis intersecting the said upright axis of the mounting structure and arranged to provide for individual upward and downward swinging movements of the blades under the influence of flight forces, and additional pivot means for each blade having a pivot axis intersecting the longitudinal axis of the blade and lying substantially within a plane 9. In an aircraft, a multi-bladed rotor system the blades of which are adapted to be wind driven in flight, a mounting structure for the blades of said system providing for common rotation thereof about a generally upright axis, and a mechanism for mounting each blade on said structure including pivot means for each blade connecting the inner end thereof to the mounting structure and providing for movement of the blade generally fore and aft in its path of rotation under the influence of flight forces about an axis substantially coinciding with said upright axis, and pivot means for each blade providing for individual generally upward and downward swinging movement thereof about an axis substantially intersecting said upright axis.

10. An aircraft having, as its primary means of sustension, an auto-rotative sustaining wing system mounted above the body of the craft on a generally upright axis, means of forward propulsion for the craft operative substantially independently of the sustaining system to effect translational flight, in which construction, in all normal conditions of flight, relative air-flow against said wing system as induced either by translational flight under the influence of the propulsion means or by descent of the craft serves to ensure auto-rotation of the system, said system including a central freely rotative mounting structure providing said upright axis, wings radially disposed about the mounting structure, and means for attaching the inner ends of the wings to the mounting structure constructed and arranged to provide a fixed physical pitch setting of the wings within the auto-rotational range and including pivot means providing wing pivot axes substantially intersecting said upright axis and substantially transverse the longitudinal axes of the wings, the wings being individually so pivoted, whereby variations in flight forces, as on the advancing and retreating sides of said system during translational flight, are compensated for by individual swinging movements of the wings to vary their effective aerodynamic angle of attack.

11. In an aircraft, a system of rotary sustaining wings or blades adapted to be wind driven in flight, an upright mounting axis member for the blades providing for common rotation thereof about a substantially upright axis, a pivot means for each blade for securing its inner end to the axis member including a fork member embracing the axis member and pivoted thereto on an axis intersecting said upright axis and arranged to provide for individual upward and downward swinging movements of the blades under the influence of flight forces, and a stop for limiting excessive downward swinging movement of each blade including a stop member co-operating with the axis member at a point just below the plane of the blade and with the fork member at a point adjacent the base of the fork.

12. In an aircraft, a rotative sustaining wing system adapted to be wind driven in flight, said system including a common upright axis structure, a plurality of sustaining wings all positioned to be rotated in the same direction about said axis structure, the wings being grouped and each group including a plurality of wings with the wings of one group located to move in a superposed path with respect to the wings of another group, and means for mounting said wings on said common axis structure including pivot means for each wing connecting the inner end thereof with the axis structure and providing a pivot axis on which the wing may swing generally upwardly and downwardly under the influence of flight forces, whereby the wings may individually swing on their pivots during rotation of the system.

13. In an aircraft, a primary means of sustension including a set of rotatively mounted sustaining wings or blades normally autorotationally actuated by relative air-flow, said blades being pivotally mounted on axes intersecting the rotational axis, in which construction there is a variable lateral positioning of the lift-line of said system under different flight conditions, and means automatically acting under the influence of varying flight conditions to produce variable aerodynamic moments compensating for said lateral variations in said lift-line.

14. In an aircraft, a rotative sustaining wing system adapted to be wind-driven in flight, said system including a common upright axis structure, a plurality of sustaining wings all positioned to be rotated in the same direction about said axis structure, and pivot means for the wings providing for movement thereof on axes intersecting the axis of said structure to vary their aerodynamic angle of attack, the wings being grouped to rotate in superposed paths, there being a plurality of wings in each group or path and the wings of each group being evenly staggered in position with reference to the wings of the other group, whereby to provide ample clearance for movement of the wings on their pivot means to vary the aerodynamic angle of attack thereof.

JUAN DE LA CIERVA.